J. W. FISCHER.
SOFT COLLAR.
APPLICATION FILED FEB. 23, 1921.
1,396,413.
Patented Nov. 8, 1921.
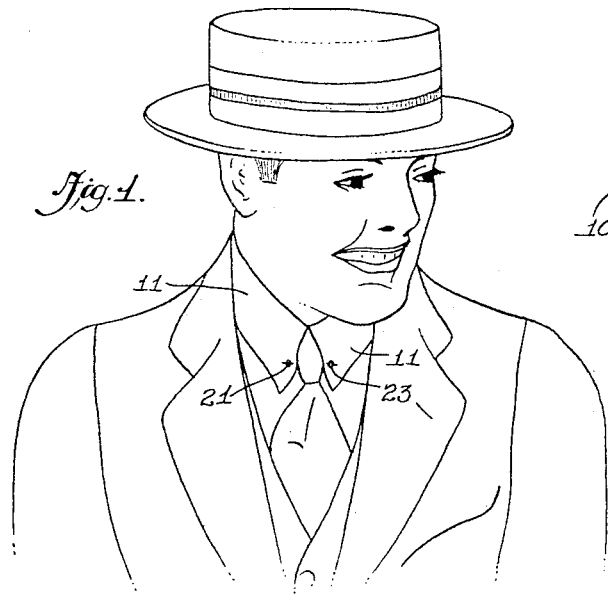
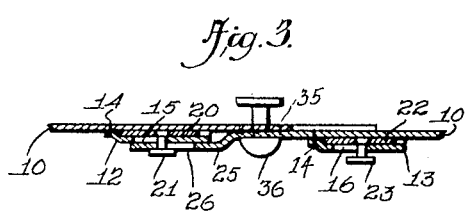
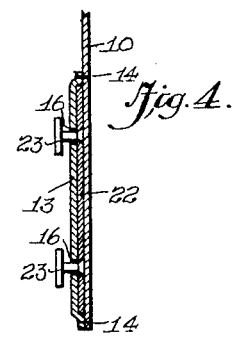
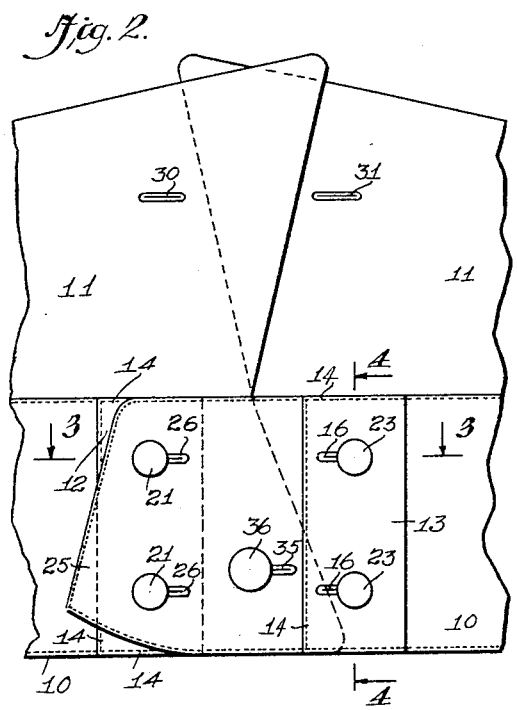
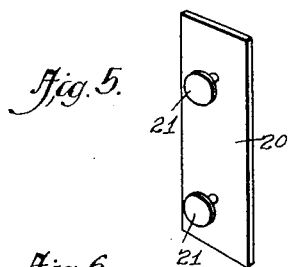
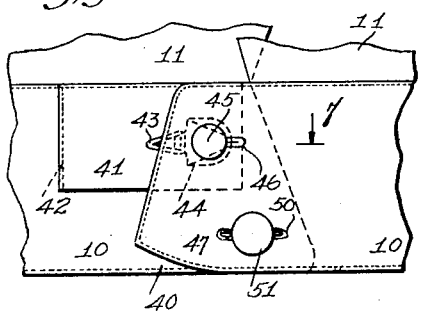
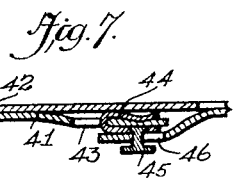
WITNESSES
INVENTOR
JOSEPH W. FISCHER
BY
ATTORNEYS

UNITED STATES PATENT OFFICE.

JOSEPH WILLIAM FISCHER, OF BROOKLYN, NEW YORK.

SOFT COLLAR.

1,396,413. Specification of Letters Patent. Patented Nov. 8, 1921.

Application filed February 23, 1921. Serial No. 447,133.

*To all whom it may concern:*

Be it known that I, JOSEPH WILLIAM FISCHER, a citizen of the United States, and a resident of the city of New York, borough of Brooklyn, in the county of Kings and State of New York, have invented a new and Improved Soft Collar, of which the following is a full, clear, and exact description.

The invention relates to wearing apparel and its object is to provide a new and improved soft turndown collar arranged to maintain the front of the collar in proper shape without danger of wilting or curling up, thus enhancing the appearance of the collar.

Another object is to permit of readily placing the stiffening means in position on the collar or removing the same therefrom for convenient laundrying of the collar.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a perspective view of the improved soft turndown collar as worn;

Fig. 2 is an enlarged front elevation of the front portion of the collar with the turndown portion swung upward;

Fig. 3 is a sectional plan view of the same on the line 3—3 of Fig. 2;

Fig. 4 is a cross section of the same on the line 4—4 of Fig. 2;

Fig. 5 is a perspective view of one of the stiffening members;

Fig. 6 is a front view of a modified form of the collar; and

Fig. 7 is a sectional plan view of the same on the line 7—7 of Fig. 6.

The collar in its general construction consists of a neckband portion 10 and a turndown portion 11, and the neckband portion is provided at the front ends with buttonhole members 12 and 13 attached by stitches 14 to the neckband portion along one end and the top and bottom of the buttonhole members to provide pockets open at the other ends. The buttonhole members 12 and 13 are provided with buttonholes 15 and 16, preferably two such buttonholes in each member and spaced apart vertically. Into the pocket formed between the buttonhole member 12 and the neckband portion 10 fits a stiffening member 20, preferably made of metal or other stiff material and provided with two buttons 21 adapted to engage the buttonholes 15, and a similar stiffening member 22 removably fits into the pocket formed by the buttonhole member 13 with the neckband portion 10, and this stiffening member is provided with two buttons 23 adapted to engage the buttonholes 16. It will be noticed that the pockets extend the height of the neckband portion 10, and the stiffening members 20 and 22 correspondingly stiffen the neckband portion 10 to prevent the same from wilting or curling up, and the said stiffening members are securely held in position by their buttons 21 and 23 engaging the buttonholes 15 and 16.

The free end 25 of the neckband portion 10 adjacent the buttonhole member 13 is provided with two buttonholes 26 spaced vertically apart and adapted to engage the buttons 21 so as to hold this end 25 securely in place. By reference to Fig. 2 it will be noticed that the buttonhole members 12 and 13 are under the turndown portion 11, and the buttonhole members 12 and 13 and the buttons 21 and 23 are completely covered up when the collar is worn. The ends of the turndown portion 11 of the collar may be provided with buttonholes 30 and 31 adapted to button onto the lowermost buttons 21 and 23 thus holding the said ends of the turndown portion firmly in position to enhance the appearance of the collar, as will be readily understood by reference to Fig. 1. The neckband portion 10 is provided at the front with the usual registering buttonholes 35 adapted to be engaged by a collar button 36 held on the neckband of the shirt. It is understood that the stiffening members 20 and 22 are removed from the pockets formed by the buttonhole members 12 and 13 to permit convenient laundrying of the collar.

In the modified form shown in Fig. 6, one end 40 of the neckband portion 10 is provided with a buttonhole member 41 arranged at the upper portion of the neckband portion under the corresponding end of the turndown portion 11, and this buttonhole member 41 is fastened in place by stitches 42 and is provided with a buttonhole 43 adapted to be engaged by a clasp 44 carrying a button 45. This button 45 is adapted to engage a buttonhole 46 formed in the other end 47 of the turndown portion 10 of the collar. It will be noticed that by this arrangement the upper portions of the ends of the neckband portion 10 are firmly connected with each other to hold the neckband against wilting or curling up. It will also be noticed that the combination clasp button 44 and 45 can be readily detached whenever it is desired to laundry the collar. The overlapping ends 40 and 47 of the neckband portion 10 are provided with the usual registering buttonholes 50 adapted to be engaged by the collar button 51 held on the neckband of the shirt.

Having thus described my invention, I claim as new and desire to secure by Letters Patent:

1. In a soft turndown collar, a buttonhole member attached to the front face of one end of the neckband portion under the turndown portion of the collar, the said buttonhole member forming a pocket with the neckband portion, the pocket being open at one side, the said buttonhole member having vertically spaced buttonholes, a stiffening member fitting removably into the said pocket and having integral spaced buttons engaging the said spaced buttonholes, the other end of the neckband portion having vertically spaced buttonholes adapted to engage the said buttons.

2. In a soft turndown collar, buttonhole members attached to the front faces of the ends of the neckband portion under the turndown portion of the collar, each of the said buttonhole members forming a pocket with the neckband portion, the pocket being open at one side, each buttonhole member having vertically spaced buttonholes, and removable stiffening members one for each pocket and each having integral spaced buttons engaging the said spaced buttonholes, one end of the said neckband portion being provided with buttonholes adapted to engage the buttons of the stiffening member in the pocket at the other end of the neckband portion.

3. In a soft turndown collar, buttonhole members attached to the front faces of the ends of the neckband portion under the turndown portion of the collar, each of the said buttonhole members forming a pocket with the neckband portion, the pocket being open at one side, each buttonhole member having vertically spaced buttonholes, and removable stiffening members one for each pocket and each having integral spaced buttons engaging the said spaced buttonholes, one end of the said neckband portion being provided with buttonholes adapted to engage the buttons of the stiffening member in the pocket at the other end of the said neckband portion, the said turndown portion of the collar having at its front ends buttonholes adapted to engage the lowermost buttons of the said stiffening members.

JOSEPH WILLIAM FISCHER.